US012246380B2

(12) United States Patent
Davis et al.

(10) Patent No.: US 12,246,380 B2
(45) Date of Patent: Mar. 11, 2025

(54) CALIBRATION COMPONENT FOR A TURBOMACHINE HAVING REPRESENTATIVE QUALITY INDICATORS

(71) Applicant: General Electric Company, Schenectady, NY (US)

(72) Inventors: Richert Arthur Davis, Greenville, SC (US); Andrew F. King, Simpsonville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 395 days.

(21) Appl. No.: 17/854,064

(22) Filed: Jun. 30, 2022

(65) Prior Publication Data

US 2024/0003263 A1   Jan. 4, 2024

(51) Int. Cl.
*B22F 10/28* (2021.01)
*B22F 10/37* (2021.01)
*B33Y 10/00* (2015.01)
*B33Y 80/00* (2015.01)
*F01D 21/00* (2006.01)
*B22F 5/00* (2006.01)

(52) U.S. Cl.
CPC .............. *B22F 10/28* (2021.01); *B22F 10/37* (2021.01); *B33Y 10/00* (2014.12); *B33Y 80/00* (2014.12); *F01D 21/003* (2013.01); *B22F 5/009* (2013.01); *F05D 2260/83* (2013.01); *G01N 2223/3037* (2013.01)

(58) Field of Classification Search
CPC ...... F01D 21/003; F05D 2260/83; B22F 5/04; B22F 5/009; G01N 2223/3037
See application file for complete search history.

(56) References Cited

U.S. PATENT DOCUMENTS

| 8,706,436 | B2 | 4/2014 | Rose et al. |
| 2011/0029114 | A1 | 2/2011 | Rose et al. |
| 2018/0126670 | A1* | 5/2018 | DehghanNiri ........ B29C 64/386 |
| 2023/0147322 | A1* | 5/2023 | Fu ........................ B33Y 40/00 419/1 |
| 2023/0158572 | A1* | 5/2023 | Li .......................... B22F 10/85 419/55 |

FOREIGN PATENT DOCUMENTS

| CN | 114260464 A | 4/2022 |
| EP | 3520930 A1 | 8/2019 |
| WO | WO2021212887 A1 | 10/2021 |

* cited by examiner

*Primary Examiner* — Nathaniel J Kolb
(74) *Attorney, Agent, or Firm* — Dority & Manning, P.A.

(57) ABSTRACT

Calibration components having a turbomachine component form factor and methods of fabricating the calibration components using an additive manufacturing system are provided. A calibration component includes a main body and one or more representative quality indicators. The one or more representative quality indicators are disposed within the main body of the calibration component. The representative quality indicators include a cavity that has a material disposed within the cavity.

19 Claims, 7 Drawing Sheets

CALIBRATION COMPONENT FOR A TURBOMACHINE HAVING REPRESENTATIVE QUALITY INDICATORS

FIELD

The present disclosure relates generally to calibration components for a scanning system. More specifically, the present disclosure relates to calibration components with a turbomachine component form factor and having representative quality indicators.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Due to the complex shapes and internal geometries of many turbomachine components, an additive manufacturing process may be utilized in order to properly fabricate the components within the tight design tolerances. For example, in a typical turbomachine, one or more rotor blades, shrouds, airfoils, fuel nozzles, and/or combustion components or subcomponents may be manufactured using an additive manufacturing process.

At least some additive manufacturing systems involve the buildup of a metal component to make a net, or near net shape component. These systems produce complex components from expensive materials at a reduced cost and with improved manufacturing efficiency. Some known additive manufacturing systems, fabricate components using a focused energy source, such as a laser device or an electron beam generator, and a particulate, such as a powdered metal.

In some known additive manufacturing systems, component quality may be reduced due to excess heat and/or variation in heat being transferred to the metal powder by the focused energy source. For example, flaws in the component may form as a result of an error in the additive manufacturing system or process. As such, components manufactured using an additive manufacturing system are generally inspected post-production to ensure the component contains no flaws, unwanted voids, or other imperfections as a result of errors in the additive manufacturing process.

Destructive inspection of the manufactured components is expensive and not possible for every component. As such, non-destructive inspection (e.g., via scanning systems that utilize X-rays) is often used to inspect the manufactured components for flaws. Such scanning systems must be calibrated or tuned in order to consistently detect flaws in the manufactured components. Traditionally, the calibration may be done by using prior printed components having known flaws, but this does not account for flaws in unknown or new areas. Additionally, surface flaws may be intentionally imparted on components using a wire EDM process (and such components may be subsequently used for calibrating the scanning system), but this is limited to exterior flaws and does not account for interior flaws.

As such, a need exists for an improved system and method for forming calibration components to perform non-destructive inspections of production components is desired and would be appreciated in the art.

BRIEF DESCRIPTION

Aspects and advantages of the calibration components and method of fabricating calibration components in accordance with the present disclosure will be set forth in part in the following description, or may be obvious from the description, or may be learned through practice of the technology.

In accordance with one embodiment, a calibration component having a form factor of a turbomachine component is provided. The calibration component includes a main body and one or more representative quality indicators. The one or more representative quality indicators are disposed within the main body of the calibration component. The representative quality indicators include a cavity that has a material disposed within the cavity.

In accordance with another embodiment, a method of fabricating a calibration component having a turbomachine component form factor using an additive manufacturing system is provided. The method includes irradiating a layer of powder in a powder bed to form a fused region. The powder is disposed on a build plate. The method further includes providing a subsequent layer of powder over the powder bed by passing a recoater arm over the powder bed. The method further includes repeating the irradiating and providing steps until the calibration component is formed on the build plate. The calibration component includes a main body and one or more representative quality indicators. The one or more representative quality indicators are disposed within the main body of the calibration component. The representative quality indicators include a cavity that has a material disposed within the cavity.

These and other features, aspects and advantages of the present calibration components and method of fabricating calibration components will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present calibration components and method of fabricating calibration components, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present calibration components and method of fabricating calibration components, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As described in detail below, exemplary embodiments of the present subject matter involve the use of additive manufacturing machines or methods. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

As used herein, references to "fusing" may refer to any suitable process for creating a bonded layer of any of the above materials. For example, if the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

Figure 1:
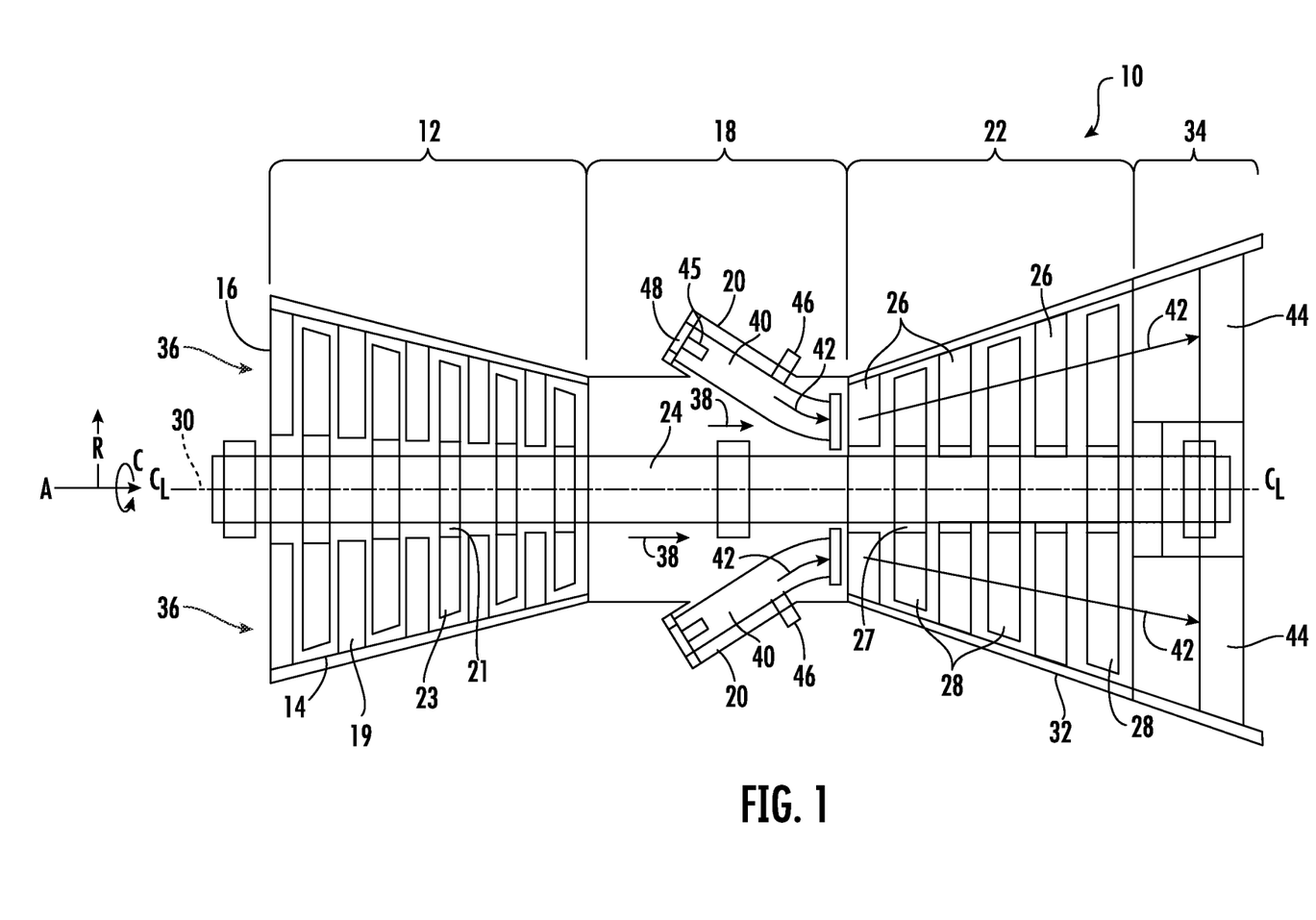
FIG. 1 is a schematic illustration of a turbomachine in accordance with embodiments of the present disclosure.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land-based and/or industrial gas turbine unless otherwise specified in the claims. For example, the invention as described herein may be used in any type of turbomachine including but not limited to a steam turbine, an aircraft gas turbine, or a marine gas turbine.

As shown in FIG. 1, the gas turbine 10 generally includes a compressor section 12. The compressor section 12 includes a compressor 14. The compressor includes an inlet 16 that is disposed at an upstream end of the gas turbine 10. The gas turbine 10 further includes a combustion section 18 having one or more combustors disposed downstream from the compressor section 12. The gas turbine further includes a turbine section 22 that is downstream from the combustion section 18. A shaft 24 extends generally axially through the gas turbine 10.

The compressor section 12 may generally include a plurality of rotor disks 21 and a plurality of rotor blades 23 extending radially outwardly from and connected to each rotor disk 21. Each rotor disk 21 in turn may be coupled to or form a portion of the shaft 24 that extends through the compressor section 12. Additionally, the compressor section 12 may include a plurality of stator vanes 19 extending from ac compressor casing between the rotor blades 23. The rotor blades 23 and the stator vanes 19 of the compressor section 12 may include turbomachine airfoils that define an airfoil shape (e.g., having a leading edge, a trailing edge, and side walls extending between the leading edge and the trailing edge).

The turbine section 22 may generally include a plurality of rotor disks 27 and a plurality of rotor blades 28 extending radially outwardly from and being interconnected to each rotor disk 27. Each rotor disk 27 in turn may be coupled to or form a portion of the shaft 24 that extends through the turbine section 22. The turbine section 22 further includes an outer casing 32 that circumferentially surrounds the portion of the shaft 24 and the rotor blades 28. The turbine section 22 may include stator vanes or stationary nozzles 26 extending radially inward from the outer casing 32. The rotor blades 28 and stator vanes 26 may be arranged in alternating stages along an axial centerline 30 of gas turbine 10. Both the rotor blades 28 and the stator vanes 26 may include turbomachine airfoils that define an airfoil shape (e.g., having a leading edge, a trailing edge, and side walls extending between the leading edge and the trailing edge)

In operation, ambient air 36 or other working fluid is drawn into the inlet 16 of the compressor 14 and is progressively compressed to provide a compressed air 38 to the combustion section 18. The compressed air 38 flows into the combustion section 18 and is mixed with fuel in one or more fuel nozzles 45 to form a combustible mixture. The one or more fuel nozzles 45 may be disposed at a forward end of the combustor 20, e.g., coupled to an end cover 48 of the combustor 20. The combustible mixture is burned within a combustion chamber 40 of the combustor 20, thereby generating combustion gases 42 that flow from the combustion chamber 40 into the turbine section 22. One or more Axial Fuel Stage (AFS) or fuel injectors 46 may be disposed downstream of the fuel nozzles 45. The one or more secondary injectors may be in fluid communication with the combustion chamber 40 to inject a second combustible mixture of fuel and air into the combustion chamber 40 downstream of the fuel nozzles 45. Energy (kinetic and/or thermal) is transferred from the combustion gases 42 to the rotor blades 28, causing the shaft 24 to rotate and produce mechanical work. The combustion gases 42 exit the turbine section 22 and flow through the exhaust diffuser 34 across a plurality of struts or main airfoils 44 that are disposed within the exhaust diffuser 34.

The gas turbine 10 may define a cylindrical coordinate system having an axial direction A extending along the axial centerline 30, a radial direction R perpendicular to the axial centerline 30, and a circumferential direction C extending around the axial centerline 30.

Figure 2:
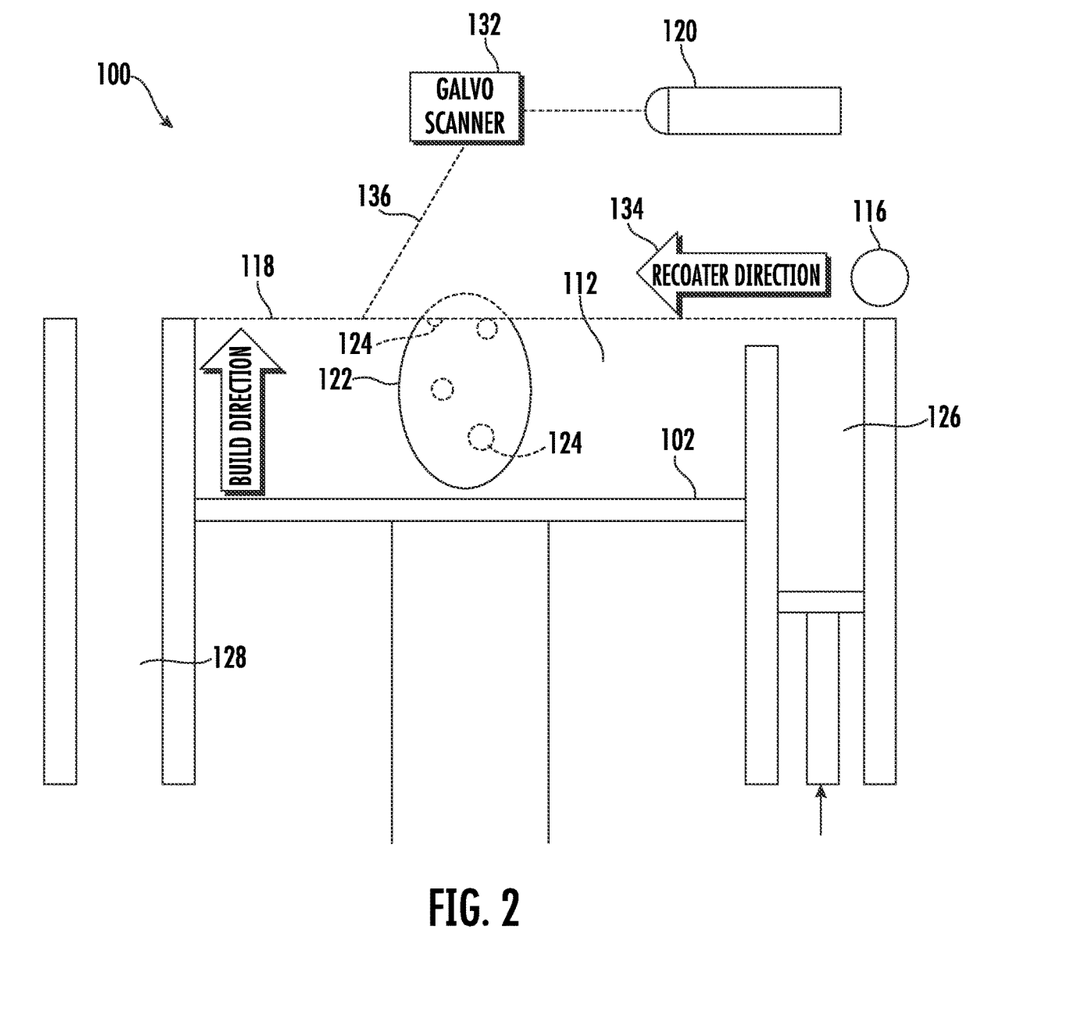
FIG. 2 illustrates a schematic view of an additive manufacturing system for generating an object in accordance with embodiments of the present disclosure.

To illustrate an example of an additive manufacturing system and process, FIG. 2 shows a schematic/block view of an additive manufacturing system 100 for generating an object 122, which may be the calibration component 200 having a turbomachine component form factor. The additive manufacturing system 100 may be configured for direct metal laser sintering (DMLS) or direct metal laser melting (DMLM). For example, the additive manufacturing system 100 may fabricate objects, such as the calibration component 200. For example, the object 122 may be fabricated in a layer-by-layer manner by sintering or melting a powder material in a powder bed 112 using an energy beam 136 generated by a source such as a laser 120. The powder to be melted by the energy beam is supplied by reservoir 126 and spread evenly over a build plate 102 using a recoater arm 116, which moves in a rocoater direction 134, to maintain the powder at a level 118 and remove excess powder material extending above the powder level 118 to waste container 128. The energy beam 136 sinters or melts a cross sectional layer of the object being built under control of the galvo scanner 132. The build plate 102 is lowered and another layer of powder is spread over the build plate and the object being built, followed by successive melting/sintering of the powder by the laser 120. The process is repeated until the object 122 is completely built up from the melted/sintered powder material. The laser 120 may be controlled by a computer system including a processor and a memory. The computer system may determine a scan pattern for each layer and control laser 120 to irradiate the powder material according to the scan pattern. After fabrication of the object 122 is complete, various post-processing procedures may be applied to the object 122. Post processing procedures include removal of excess powder by, for example, blowing or vacuuming. Other post processing procedures include a stress release process. Additionally, thermal and chemical post processing procedures can be used to finish the object 122.

As shown in FIG. 2, in exemplary embodiments, the object 122 may include one or more representative quality indicators (RQIs) 124 disposed within the object 122. As discussed below, the one or more representative quality indicators 124 may be voids or cavities filled with unfused powder material and disposed within the object 122 (e.g., below the exterior surface of the object 122, such that the RQIs 124 are not in contact with ambient air). The RQIs 124 may be fabricated in a layer-by-layer manner by sintering or melting the powder material around the RQI 124 (i.e., the RQI 124 may be formed by not sintering or melting the powder material in the area designated for the RQI 124. As such, as the object 122 is being formed, the RQI 124 may simultaneously be formed and slowly filled with unfused powder material. For example, because the RQI 124 may be a void or cavity disposed within the object 122, as the object 122 and RQIs are being formed, the RQI is disposed below the level 118 of powder, such that the void or cavity slowly collect unfused powder material each time the recoater arm 116 passes. In this way, once the RQI 124 is fully formed in the object 122, it may be a void or cavity defined by fused powder material that is filled with unfused powder material.

Figure 3:
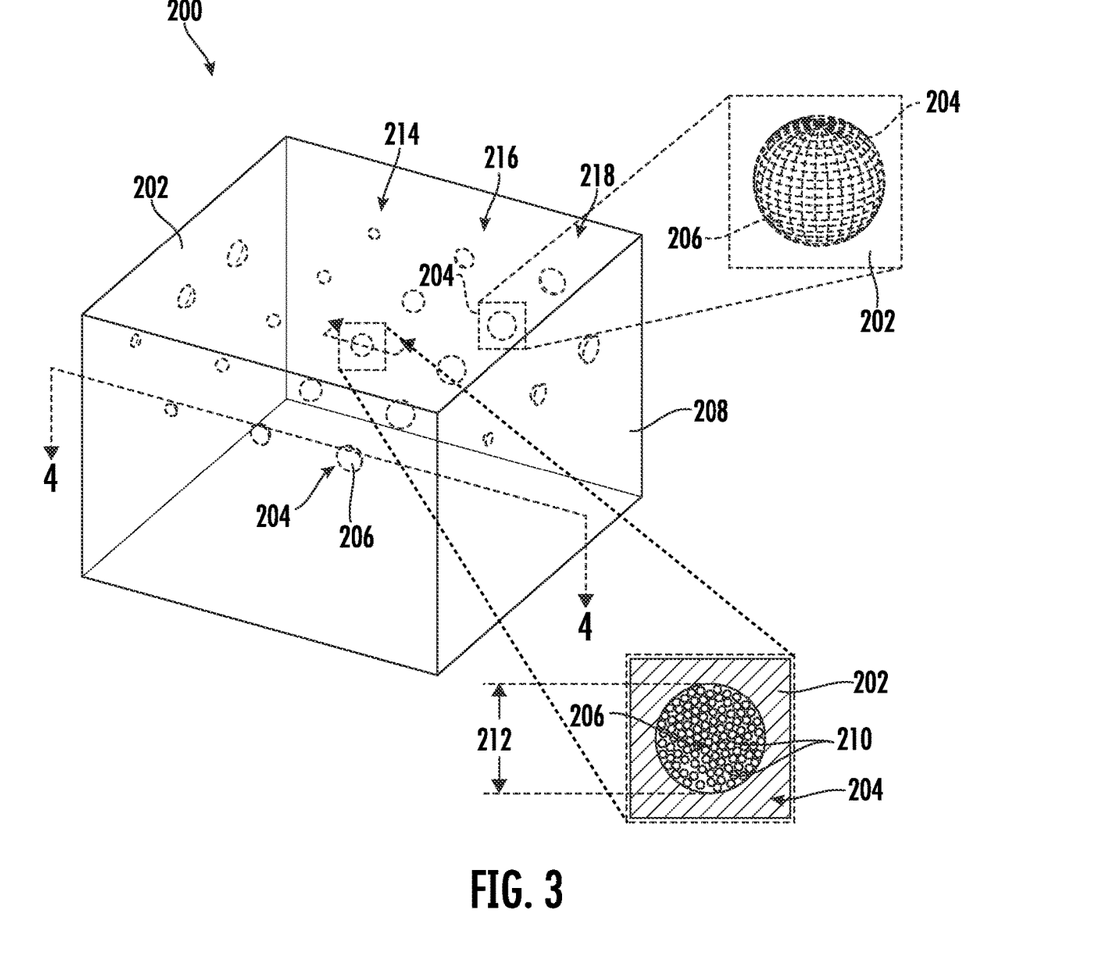
FIG. 3 illustrates a perspective view of a calibration component in accordance with embodiments of the present disclosure.
Figure 4:
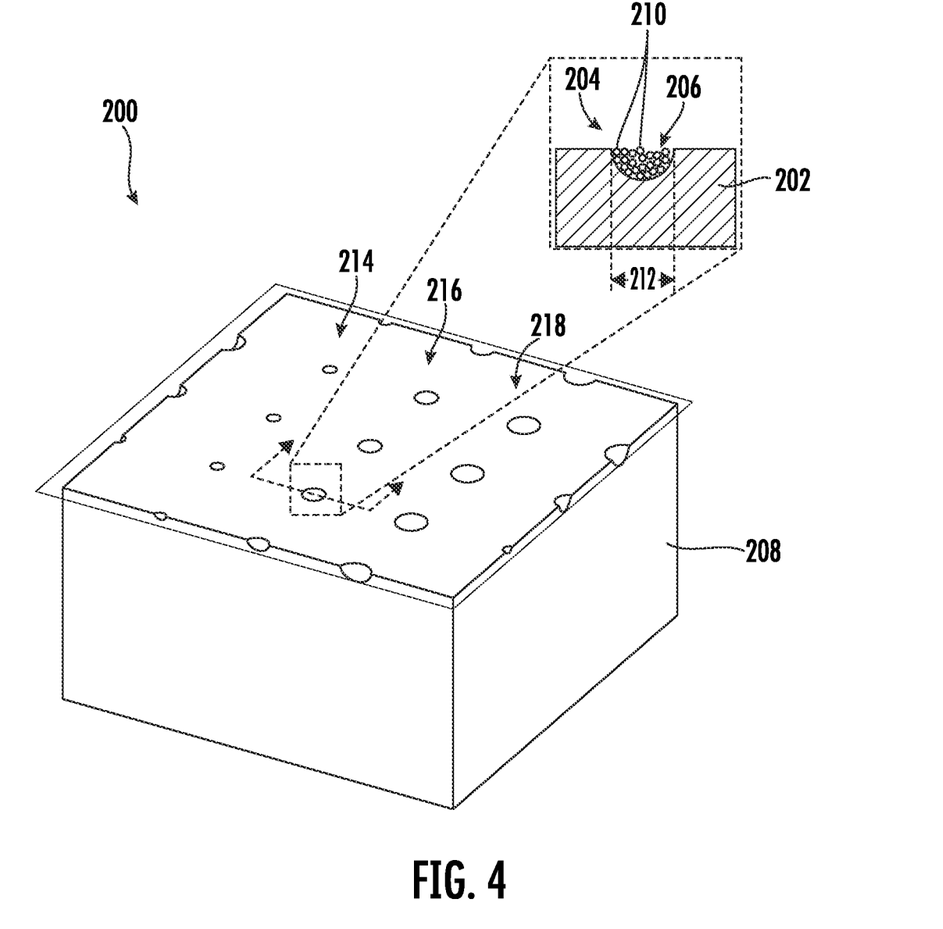
FIG. 4 illustrates a cross sectional view of the calibration component shown in FIG. 3 from along the line 4-4 in accordance with embodiments of the present disclosure.

FIG. 3 illustrates a calibration component 200, which may be formed by the additive manufacturing system 100 shown in FIG. 2, and FIG. 4 illustrates a cross sectional view of the calibration component 200 shown in FIG. 3, in accordance with embodiments of the present disclosure. The calibration component 200 may be used for calibrating (or tuning) a Computed Tomography (CT) system. The CT system may use irradiation (such as X-rays) to produce three-dimensional internal and external representations of a scanned object (such as the calibration component 200). The sensitivity to material anomalies and measurement accuracy of CT systems are inversely related to the energy level of the X-ray source used in the CT systems. The amount and density of the material of the object impacts the ability of X-rays to penetrate the part and reach the X-ray detector. When insufficient X-rays reach the detector, the object has been considered uninspectable with X-rays of that energy level. However, it is desirable to maximize the sensitivity and accuracy of the CT system while minimizing the amount of X-rays used for inspection.

As shown, the calibration component 200 may include a main body 202 and one or more Representative Quality Indicators (RQIs) 204 disposed within the main body 202 of the calibration component 200. If a CT system is able to detect the RQIs 204 within the main body 202 of the calibration component 200, then the CT system will be able to detect flaws in production components having a similar size to the RQIs, in a similar location as the RQIs, and with a similar material density as the density as the RQI 204.

In exemplary embodiments, the calibration component 200 may include a plurality of RQIs 204 disposed within the main body 202 of the calibration component 200. Each of the RQI's may include a cavity 206, which may be a void, space, or other space defined within the main body 202. For example, the cavity 206 may be defined within the main body 202 beneath an exterior surface 208 of the main body 202, such that the cavity 206 may be entirely defined by the main body 202, and such that the cavity 206 is fluidly isolated from the ambient environment (i.e., the atmosphere or ambient air).

In many embodiments, the RQI 204 may further include material 210 disposed within the cavity 206. In some embodiments, the material 210 may be a solid material. In other embodiments, the material 210 may be a fluid material (such as a liquid or a gas). In exemplary embodiments, the material 210 disposed in the cavity 206 may be a powder material in a powder form (such as a powdered metal material). Additionally, the main body 202 may be formed from the powder material (e.g., the main body 202 may be formed from the same powder material that is disposed in the cavity 206, except the powder material from which the main body 202 is formed may be fused together). Stated otherwise, the main body 202 may be formed from a powdered metal material that is fused together, and the material 210 in the cavity 206 may be the same powdered metal material that is unfused. The cavity 206 may be filled with material 210 such that the boundaries defining the cavity 206 may be in contact with the material 210. The material 210 may have a cross sectional shape of a circle. Each particle of the powder material disposed in the cavity 206 may define a diameter, and the diameter of each particle of the powder material may vary.

In some embodiment, the material 210 disposed within the cavity 206 may be a first material, and the main body 202 of the calibration component 200 may be formed from a second material that is different than the first material. For example, the first material may be selected from the following list: pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). In such embodiments, the second material may be a different material selected from the following list: pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation).

As shown in FIG. 3, the cavity 206 may be spherical (e.g., spherically shaped). The spherical shape of the cavity 206 may advantageously allow for the calibration component 200 to be additively manufactured (e.g., via the additive manufacturing system 100) at any angle or orientation with respect to the build plate 102, thereby maximizing the number of calibration components 200 that can be disposed on a singular build plate 102. For example, the spherical shape of the cavity 206 may be "layered" or "sliced" in a similar manner no matter how the calibration component 200 is angled or oriented with respect to the build plate 102, which would not be true for other shapes (such as e.g., a cube, cylinder, or others). As such, the spherical shape of the cavity 206 allows the RQIs 204 to be easily employed with a variety of different turbomachine components without regard to the components build orientation or angle. Additionally, the spherical shape of the cavity 206 does not require any removable (or temporary) supports during the additive manufacturing process.

As shown in FIGS. 3 and 4, the plurality of representative quality indicators 204 may include differently sized representative quality indicators 204. For example, each RQI 204 may define a diameter 212, and the plurality of RQIs 204 may include different (or varying) diameters 212. The varying diameters 212 may advantageously facilitate calibration or tuning of a CT system. For example, if a CT system is able to visualize or detect an RQI having a larger diameter but not an RQI having a smaller diameter, then the CT system may need to be calibrated or tuned (e.g., the X-ray intensity may be adjusted) such that the CT system can detect or visualize all the sizes of RQIs, thereby ensuring that the CT system will detect actual flaws in production components having similar sizes. In many embodiments, the calibration component 200 may include a first row 214 of RQIs 204 having a first size, a second row 216 of RQIs 204 having a second size, and a third row 218 of RQIs 204 having a third size. The first size may be smaller than the second size, and the second size may be smaller than the third size. Each row 214, 216, 218 may include two or more RQIs 204 disposed along a common axis (e.g., the RQIs 204 in the first row 214 may each be disposed along a first common axis, the RQIs 204 in the second row 216 may each be disposed along a second common axis, and the RQIs 204 in the third row 218 may each be disposed along a third common axis). The common axis for each row 214, 216, 218 may be generally parallel to one another.

In various embodiments, the diameter 212 of the RQIs 204 may be between about 0.01 inches and about 0.1 inches, or between about 0.015 inches and about 0.9, or between about 0.2 inches and about 0.8 inches, or between about 0.3 inches and about 0.7 inches, or between about 0.4 inches and about 0.6 inches.

When inspecting a component, the CT system attempts to detect flaws (such as porosity, lack of inclusion, non-fused area, non-overlapping printing areas). The CT system is able to detect such flaws by using contrast discrimination in the CT scan, which is related to the material density of the component being scanned. For example, lower density areas, or flawed areas (such as voids, lack of fusion, non-fused areas) will have a lower density than the body of the component, such that the flawed areas will appear darker in the scanned image. Accordingly, as should be appreciated, filling the cavity 206 with a material 210 (such as an unfused powder material) may be advantageous because it allows the CT system to be tuned or calibrated to a higher degree of specificity due to the minimal density difference. Additionally, the difference in density between the main body 202 and the RQI 204 (filled with powder material) is less than it would be if the RQI was empty (or filled with air), which allows the contrast discrimination of the CT system to be tuned more precisely, such that the CT system can have an increased likelihood of detecting flaws in production components.

In many embodiments, a first density of the material 210 within the cavity 206 may be less than a second density of the main body 202. For example, in exemplary embodiments, the material 210 (e.g., unfused powder material) within the cavity 206 of the RQI 204 may have a first density that is between about 10% and about 90% less than a second density of the main body 202. In other embodiments, the material 210 (e.g., unfused powder material) within the cavity 206 of the RQI 204 may have a first density that is between about 20% and about 80% less than a second density of the main body 202. In some embodiments, the material 210 (e.g., unfused powder material) within the cavity 206 of the RQI 204 may have a first density that is between about 30% and about 70% less than a second density of the main body 202. In various embodiments, the material 210 (e.g., unfused powder material) within the cavity 206 of the RQI 204 may have a first density that is between about 40% and about 60% less than a second density of the main body 202.

Figure 5:
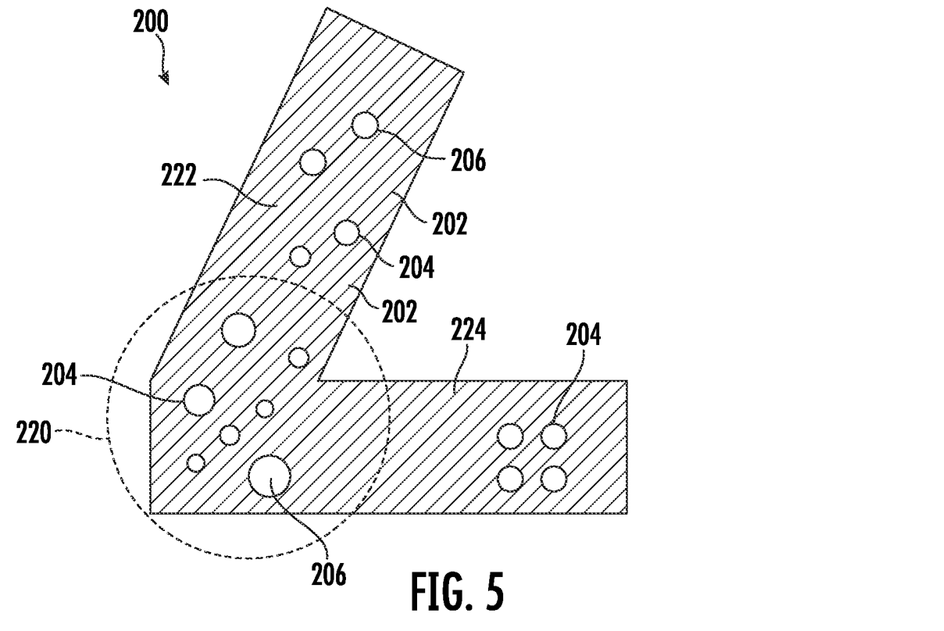
FIG. 5 illustrates a cross-sectional view of a calibration component having a main body with one or more representative quality indicators disposed in the main body in accordance with embodiments of the present disclosure.
Figure 6:
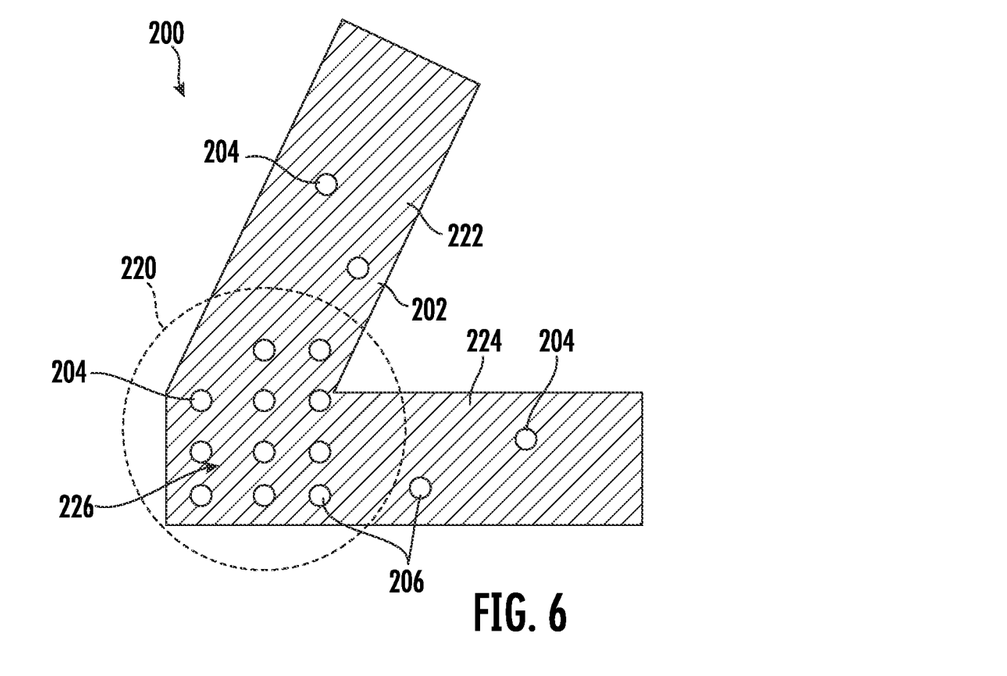
FIG. 6 illustrates a cross-sectional view of a calibration component having a main body with one or more representative quality indicators disposed in the main body in accordance with embodiments of the present disclosure.

FIGS. 5 and 6 each illustrate a cross-sectional view of a calibration component 200 having a main body 202 with one or more representative quality indicators 204 disposed in the main body 202, in accordance with embodiments of the present disclosure. As shown, the calibration component 200 may include a first portion 222 and a second portion 224. As shown, in many embodiments, the calibration component 200 may define an area of high manufacturing stress 220, and the one or more representative quality indicators 204 may be disposed in the area of high manufacturing stress 220. In various embodiments, the area of high manufacturing stress 220 may be a junction (such as a junction between the first portion 222 and the second portion 224), angle or change in angle, or change in thickness of the calibration component 200 as the calibration component 200 extends in a vertical direction V (e.g., the build direction of the additive manufacturing system 100). For example, an area of high manufacturing stress 220 may be defined between portions 222, 224 of the calibration component 200 having an angle of greater than about 40°, or greater than about 80°, or greater than about 120°. Additionally, an area of high manufacturing stress 220 may be defined where a change in thickness of the calibration component 200 as the calibration component 200 extends in the vertical direction V (e.g., the build direction) is greater than about 20%, or greater than about 40%, or greater than about 60%, or greater than about 80%.

As shown in FIG. 5, in some embodiments, the plurality of representative quality indicators 204 may be arranged in a pattern 226. For example, the plurality of representative quality indicators 204 may be arranged in a square pattern, diamond pattern, triangle pattern, or any other pattern. For example, a pattern may be a repeated arrangement of RQIs 204 in a specified direction. In various embodiments, the RQIs 204 may be arranged in a pattern within the area of high manufacturing stress 220. In other embodiments, as shown in FIG. 6, the plurality of representative quality indicators 204 may not arranged in a pattern. In such embodiments, the RQIs 204 may be arranged randomly (i.e., with no repeated arrangement of RQIs 204 in a specified direction).

In exemplary embodiments the calibration component 200 may have a form factor of a turbomachine component. The form factor may define the size, shape, and physical structure of the calibration component 200. For example, the form factor of the calibration component 200 may be one of a compressor section 12 component, a combustion section 18 component, or a turbine section 22 component. For example, the calibration component 200 may have a form factor of a compressor section 12 component, such as a rotor blade 23, a stator vane 19, or other compressor section 12 component. In other embodiments, the calibration component 200 may have a form factor of a combustion section 18 component, such as a fuel nozzle 45 (or a portion of a fuel nozzle 45), a fuel injector 46 (or a portion of a fuel injector 46), or other combustion section 18 components. In yet another embodiment, the calibration component 200 may have a form factor of a turbine section 22 component, such at a rotor blade 28, a stator vane 26, or other turbine section 22 component.

Figure 7:
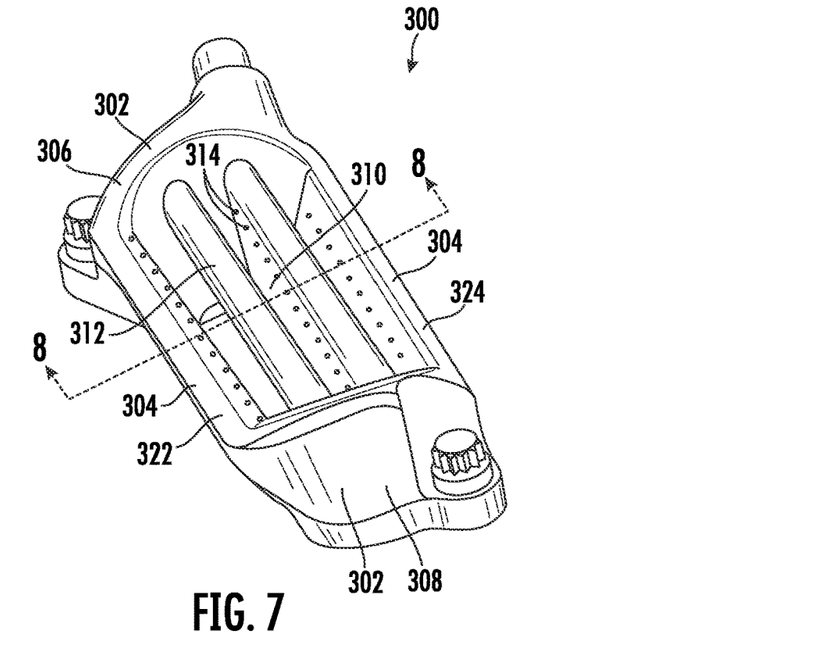
FIG. 7 illustrates a calibration component having a form factor of a fuel injector in accordance with embodiments of the present disclosure.
Figure 8:
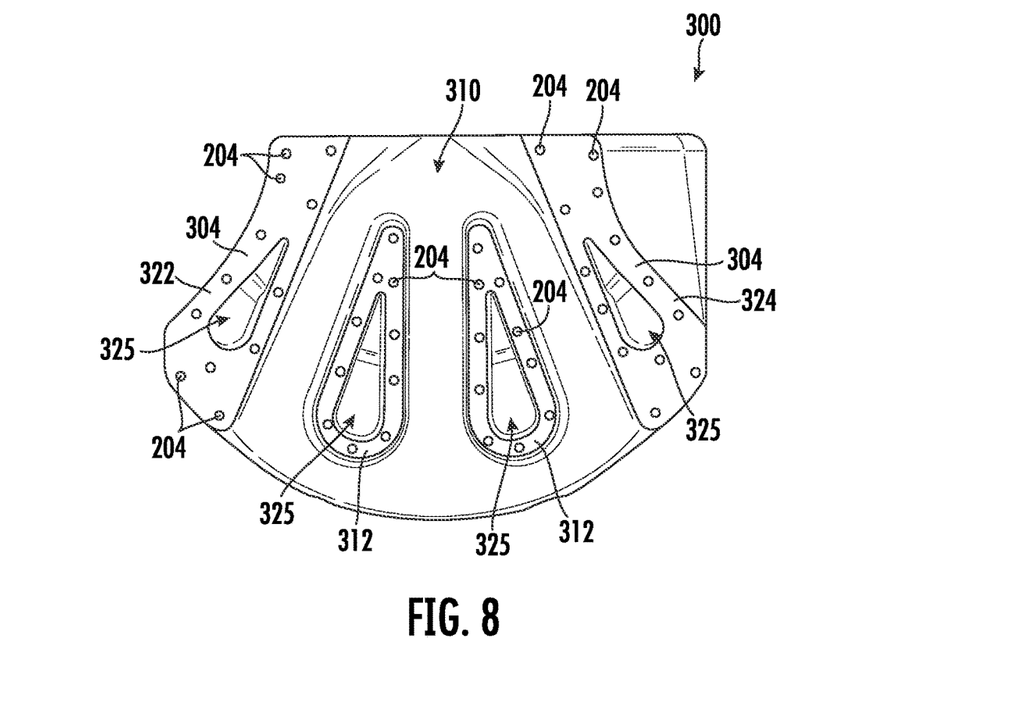
FIG. 8 illustrates a cross-sectional view of the calibration component along the line 8-8 shown in FIG. 7 in accordance with embodiments of the present disclosure.

As one non-limiting example, FIG. 7 illustrates a calibration component 200 having a form factor of a fuel injector 300 (such as the fuel injector 46 shown in FIG. 1), and FIG. 8 illustrates a cross-sectional view of the calibration component 200 along the line 8-8 shown in FIG. 7, in accordance with embodiments of the present disclosure. As shown in FIGS. 7 and 8, the fuel injector 300 includes end walls 302 spaced apart from one another and side walls 304 extending between the end walls 302. In many embodiments, when installed in a combustion section 18, the side walls 304 of the fuel injector 300 may extend parallel to the axial direction A. The end walls 302 of the fuel injector 300 include a forward end wall 306 and an aft end wall 308 disposed oppositely from one another. The side walls 304 may be spaced apart from one another and may extend between the forward end wall 306 and the aft end wall 308. In many embodiments, both the forward end wall 306 and the aft end wall 308 may be arcuate and have a generally rounded cross-sectional shape, and the side walls 304 may extend generally straight between the end walls 302, such that the end walls 302 and the side walls 304 collectively define an opening 310 having a cross section shaped as a geometric stadium. In various embodiments, the side walls 304 may be longer than the end walls 302 such that the opening 310 is the longest in the axial direction. The fuel injector 300 may further include at least one fuel injection member 312, which may be disposed within the opening 310 and extend axially between the end walls 302. The fuel injection members 312 may be substantially hollow bodies that function to provide fuel to the opening 310 via a plurality of fuel ports 314 defined through the fuel injection members 312. Each of the fuel injection members may extend from a first end located at the forward end wall 306 to a second end positioned at the aft end wall 308. In many embodiments, the fuel injection members 312 may be spaced apart from one another within the opening 310 may extend straight, i.e., without a sudden change in direction, from the forward end wall 306 to the aft end wall 308 in the axial direction A. In many embodiments, as shown, the side walls 304 may include a first side wall fuel injection member 322 and a second side wall fuel injection member 324. For example, the side wall fuel injection members 322, 324 may be integrally formed within the side walls 304, such that they function to both partially define the opening 310 and inject fuel through the plurality of fuel ports 314 for mixing within the fuel injector 300. Each fuel injection member 312 and the side wall fuel injection members 322, 324 may define a fuel plenum 325 (which may be teardrop shaped).

As shown in FIG. 8, the fuel injector 300 may include one or more Representative Quality Indicators (RQIs) 204. For example, the RQIs 204 may be disposed below the exterior surface of the fuel injector 300 (e.g., internal to the fuel injector 300). One or more RQIs may be disposed in the end walls 302, side walls 304, the fuel injection members 312, the side wall fuel injection members 322, 324, or other locations on the fuel injector 300. For example, a plurality of RQIs 204 may be spaced apart and generally circumscribe (or surround) the fuel plenum 325 of each fuel injection member 312 and the side wall fuel injection members 322, 324.

Figure 9:
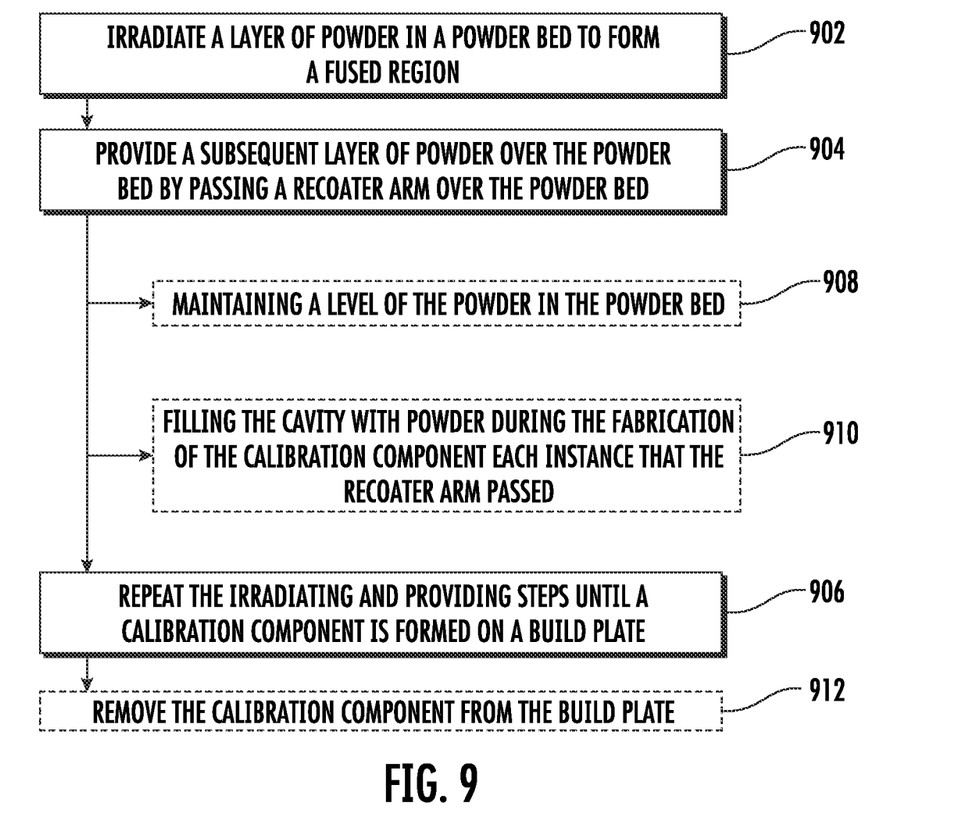
FIG. 9 is a flow chart of a method of fabricating a calibration component having a turbomachine component form factor using an additive manufacturing system in accordance with embodiments of the present disclosure.

Referring now to FIG. 9, a flow diagram of one embodiment of a method 900 of fabricating a calibration component 200 having a turbomachine component form factor using an additive manufacturing system 100 is illustrated in accordance with aspects of the present subject matter. In general, the method 900 will be described herein with reference to the gas turbine 10, the calibration component 200, and the additive manufacturing system 100 described above with reference to FIGS. 1 through 8. However, it will be appreciated by those of ordinary skill in the art that the disclosed method 900 may generally be utilized with any suitable gas turbine and/or may be utilized in connection with any additive manufacturing system having any other suitable system configuration. In addition, although FIG. 9 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure.

In many implementations, the method 900 may include at (902) irradiating a layer of powder in a powder bed 112 to form a fused region. In many embodiments, as shown in FIG. 2, the powder bed 112 may be disposed on the build plate 102, such that the fused region is fixedly attached to the build plate 102. The method 900 may further include at (904) of providing a subsequent layer of powder over the powder bed 112 (e.g., from a first side of the powder bed 112) by passing a recoater arm 116 over the powder bed 112. The recoater arm 116 may distribute each layer of powder over the powder bed 112 by passing over the powder bed 112 from a first side to a second side while laying (e.g., dispensing) powder over the powder bed 112. The method 900 further includes at (906) repeating steps 902 and 904 until the calibration component 200 is formed in the powder bed 112.

In optional embodiments, passing the recoater arm 116 over the powder bed 112 at 904 may further include at (908) maintaining a level of the powder in the powder bed. For example, when the recoater arm passes from one side to the other while dispensing a new layer of powder, the recoater arm may brush or scrape along a plane to maintain a level 118 of powder. In many implementations, during fabrication of the calibration component 200 using the additive manufacturing system 100, the cavity 206 may be disposed below (e.g., closer to the build plate 102 with respect to the build direction) the level 118 of powder. In optional embodiments, the method providing at 904 may further include at (910) filling the cavity 206 with powder during the fabrication of the calibration component 200 each instance that the recoater arm passes. For example, each time the recoater arm 116 passes and dispenses a new layer of powder, such powder may gradually collect within the cavity 206 until the cavity 206 is fully formed thereby encapsulating the unfused powder within the cavity 206. Finally, in optional embodiments, the method 900 may further include at (912) removing the calibration component 200 from the build plate 102 (e.g., once the calibration component 200 is fully formed).

In some embodiments, the method 900 may further include scanning the calibration component with a CT scanning system to detect the RQIs 204 within the calibration component 200 by generating an image of the internal structure of the calibration component (e.g., the RQIs 204 should appear dark in the generated image). As a result of the scanning step, the CT system may be tuned or calibrated (e.g., by adjusting an intensity of the X-rays emitted by the CT system. For example, if an RQI 204 is not detected as a result of the scanning step, then the intensity of the X-rays of the CT system may be increased (or decreased in some CT systems).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A calibration component having a form factor of a turbomachine component, the calibration component comprising: a main body; and one or more representative quality indicators disposed within the main body of the calibration component, the representative quality indicators comprising a cavity having a material disposed within the cavity.

The calibration component as in any of the preceding clauses, wherein the cavity is spherical.

The calibration component as in any of the preceding clauses, wherein the material disposed in the cavity is a powder material in powder form.

The calibration component as in any of the preceding clauses, wherein the main body is formed from the powder material.

The calibration component as in any of the preceding clauses, wherein the material is a first material, and wherein the main body of the calibration component is formed from a second material that is different than the first material.

The calibration component as in any of the preceding clauses, further comprising a plurality of representative quality indicators.

The calibration component as in any of the preceding clauses, wherein the plurality of representative quality indicators comprise differently sized representative quality indicators.

The calibration component as in any of the preceding clauses, wherein the plurality of representative quality indicators are arranged in a pattern.

The calibration component as in any of the preceding clauses, wherein the plurality of representative quality indicators are not arranged in a pattern.

The calibration component as in any of the preceding clauses, wherein the one or more representative quality indicators each define a diameter of between about inches and about 0.1 inches.

The calibration component as in any of the preceding clauses, wherein a first density of the material within the cavity may be less than a second density of the main body.

The calibration component as in any of the preceding clauses, wherein the first density is between about 10% and about 90% less than the second density of the main body.

The calibration component as in any of the preceding clauses, wherein calibration component comprises an area of high manufacturing stress, and wherein the one or more representative quality indicators are disposed in the area of high manufacturing stress.

The calibration component as in any of the preceding clauses, wherein the turbomachine component form factor is one of a compressor section component, a combustion section component, or a turbine section component.

A method of fabricating a calibration component having a turbomachine component form factor using an additive manufacturing system, the method comprising: irradiating a layer of powder in a powder bed to form a fused region, wherein the powder is disposed on a build plate; providing a subsequent layer of powder over the powder bed by passing a recoater arm over the powder bed; and repeating the irradiating and providing steps until the calibration component is formed on the build plate, the calibration component comprising: a main body; and one or more representative quality indicators disposed within the main body of the calibration component, the representative quality indicators comprising a cavity having the powder disposed within the cavity.

The method as in any of the preceding clauses, wherein passing the recoater arm over the powder bed further comprises maintaining a level of powder in the powder bed.

The method as in any of the preceding clauses, wherein the cavity is disposed below the level of powder during the fabrication of the calibration component.

The method as in any of the preceding clauses, further comprising filling the cavity with powder during the fabrication of the calibration component each instance that the recoater arm passes.

The method as in any of the preceding clauses, wherein the cavity is spherical.

The method as in any of the preceding clauses, further comprising removing the calibration component from the build plate.

What is claimed is:

1. A calibration component having a form factor of a turbomachine component, the calibration component comprising:
   a main body; and
   one or more representative quality indicators disposed within the main body of the calibration component, the representative quality indicators comprising a cavity having a material disposed within the cavity, wherein the material disposed in the cavity is an unfused powder material.

2. The calibration component as in claim 1, wherein the cavity is spherical.

3. The calibration component as in claim 1, wherein the main body is formed from a fused powder material.

4. The calibration component as in claim 1, wherein the material is a first material, and wherein the main body of the calibration component is formed from a second material that is different than the first material.

5. The calibration component as in claim 1, further comprising a plurality of representative quality indicators.

6. The calibration component as in claim 5, wherein the plurality of representative quality indicators comprise differently sized representative quality indicators.

7. The calibration component as in claim 5, wherein the plurality of representative quality indicators are arranged in a pattern.

8. The calibration component as in claim 5, wherein the plurality of representative quality indicators are not arranged in a pattern.

9. The calibration component as in claim 1, wherein the one or more representative quality indicators each define a diameter of between about 0.01 inches and about 0.1 inches.

10. The calibration component as in claim 1, wherein a first density of the material within the cavity may be less than a second density of the main body.

11. The calibration component as in claim 10, wherein the first density is between about 10% and about 90% less than the second density of the main body.

12. The calibration component as in claim 1, wherein calibration component comprises an area of manufacturing stress, and wherein the one or more representative quality indicators are disposed in the area of manufacturing stress, wherein the area of manufacturing stress is disposed at one of:
an angle change between a first portion and a second portion of the calibration component; or
a change in thickness of the calibration component.

13. The calibration component as in claim 1, wherein the calibration component is one of a compressor section component, a combustion section component, or a turbine section component.

14. A method of fabricating a calibration component having a turbomachine component form factor using an additive manufacturing system, the method comprising:
irradiating a layer of powder in a powder bed to form a fused region, wherein the powder is disposed on a build plate;
providing a subsequent layer of powder over the powder bed by passing a recoater arm over the powder bed;
repeating the irradiating and providing steps until the calibration component is formed on the build plate, the calibration component comprising:
a main body; and
one or more representative quality indicators disposed within the main body of the calibration component, the representative quality indicators comprising a cavity having the powder disposed within the cavity; and
filling the cavity with the powder during the fabrication of the calibration component each instance that the recoater arm passes.

15. The method as in claim 14, wherein passing the recoater arm over the powder bed further comprises maintaining a level of powder in the powder bed.

16. The method as in claim 15, wherein the cavity is disposed below the level of powder during the fabrication of the calibration component.

17. The method as in claim 14, wherein the cavity is spherical.

18. The method as in claim 14, further comprising removing the calibration component from the build plate.

19. A calibration component having a form factor of a turbomachine component, the calibration component comprising:
a main body; and
one or more representative quality indicators disposed within the main body of the calibration component, the representative quality indicators comprising a cavity having a material disposed within the cavity, wherein the material is a first material, and wherein the main body of the calibration component is formed from a second material that is different than the first material.

* * * * *